US011276041B2

(12) United States Patent
Garg et al.

(10) Patent No.: US 11,276,041 B2
(45) Date of Patent: Mar. 15, 2022

(54) SCHEDULING USING POTENTIAL CALENDARS

(71) Applicant: Microsoft Technology Licensing, LLC, Redmond, WA (US)

(72) Inventors: Vivek Garg, Redmond, WA (US); Christopher Jay Hoorn, Redmond, WA (US); Robert David Berg, Redmond, WA (US); Erica L. Klein, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1208 days.

(21) Appl. No.: 14/954,187

(22) Filed: Nov. 30, 2015

(65) Prior Publication Data

US 2017/0154315 A1    Jun. 1, 2017

(51) Int. Cl.
*G06Q 10/10* (2012.01)

(52) U.S. Cl.
CPC ..... *G06Q 10/1095* (2013.01); *G06Q 10/1093* (2013.01)

(58) Field of Classification Search
CPC combination set(s) only.
See application file for complete search history.

(56) References Cited

U.S. PATENT DOCUMENTS

| | | | |
|---|---|---|---|
| 6,101,480 A | | 8/2000 | Conmy et al. |
| 9,626,659 B2 * | | 4/2017 | Bathiya ............... G06Q 10/1095 |
| 2003/0149606 A1 | | 8/2003 | Cragun et al. |

(Continued)

FOREIGN PATENT DOCUMENTS

WO    WO-2015030718 A1 *    3/2015    ........... G06Q 10/109

OTHER PUBLICATIONS

Hossain, SM Mozammal, et al. A deliberative agent for meeting scheduling. 2013 IEEE 27th International Conference on Advanced Information Networking and Applications (AINA). IEEE, 2013 [online], [retrieved on Nov. 29, 2021], From Internet https://ieeexplore.ieee.org/stamp/stamp.jsp?arnumber=6531827 (Year: 2013).*

(Continued)

*Primary Examiner* — Jerry O'Connor
*Assistant Examiner* — Michael R Koester
(74) *Attorney, Agent, or Firm* — Shook, Hardy and Bacon, L.L.P.

(57) ABSTRACT

Scheduling one or more users via potential calendars is presented. In preparing a potential schedule request, one or more potential time slots in which the to-be scheduled event may be held are identified. The potential schedule is sent to the scheduled users and the potential time slots for the potential schedule event are added to the users' calendars. In response to clarifying information, one or more potential time slots of the potential schedule request may be removed from consideration for the potential schedule event. A selection is made regarding a potential time slot for the potential schedule event and the potential schedule event is promoted to the explicit calendars of the scheduled users to be held at the selected potential time slot. In promoting the potential schedule event to the explicit calendars, the potential event is removed from the potential calendars, including any remaining potential time slots.

20 Claims, 7 Drawing Sheets

(56) References Cited

U.S. PATENT DOCUMENTS

| | | | | |
|---|---|---|---|---|
| 2013/0317873 A1* | 11/2013 | Kozloski | .............. | G06Q 10/109 |
| | | | | 705/7.19 |
| 2013/0317874 A1* | 11/2013 | Kozloski | .............. | G06Q 10/109 |
| | | | | 705/7.19 |
| 2014/0149886 A1* | 5/2014 | Los | ....................... | G06F 3/0481 |
| | | | | 715/753 |
| 2015/0324754 A1* | 11/2015 | Bathiya | ................ | G06Q 10/109 |
| | | | | 705/7.19 |
| 2016/0155094 A1* | 6/2016 | Rentsch | .............. | G06Q 10/109 |
| | | | | 705/7.19 |

OTHER PUBLICATIONS

"International Preliminary Report on Patentability Issued in PCT Application No. PCT/US2016/062647", dated Feb. 9, 2018, 6 pages.

"International Search Report and Written Opinion Issued in PCT Application No. PCT/US2016/062647", dated Feb. 3, 2017, 10 Pages.

"Second Written Opinion Issued in PCT Application No. PCT/US2016/062647", dated Nov. 6, 2017, 5 Pages.

* cited by examiner

SCHEDULING USING POTENTIAL CALENDARS

BACKGROUND

Current versions of digital calendars in regard to scheduling appointments is far from ideal. When examining a user's digital calendar for scheduling purposes, that user's calendar will show the user's schedule as "slots" or blocks of time, where times are represented by a limited set of states. These states typically include a free state (the computer user has nothing scheduled for the corresponding block of time), a busy state (the computer user has committed to a particular activity/appointment at the particular block of time), and a tentative state (the computer user has tentatively committed to a particular activity/appointment at that time). However, the reality is that many computer users will block out times as being busy when, in fact, they are not necessarily busy, while others will tentatively accept all schedule requests irrespective of whether or not they actually intend to attend the requested activity/appointment. Further still, schedule requests are typically identified as being tentatively accepted in those cases where the user hasn't even had a chance to review and/or respond.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, scheduling one or more users via potential calendars is presented. In preparing a potential schedule request, one or more potential time slots in which the to-be scheduled event may be held are identified. The potential schedule is sent to the scheduled users and the potential time slots for the potential schedule event are added to the users' calendars. In response to clarifying information, one or more potential time slots of the potential schedule request may be removed from consideration for the potential schedule event. A selection is made regarding a potential time slot for the potential schedule event and the potential schedule event is promoted to the explicit calendars of the scheduled users to be held at the selected potential time slot. In promoting the potential schedule event to the explicit calendars, the potential event is removed from the potential calendars, including any remaining potential time slots.

According to additional aspects of the disclosed subject matter, a method for scheduling one or more users according to a schedule request from an originating user is presented. The method comprises providing a potential calendar for each of a plurality of users, including an originating user and one or more receiving users. A potential schedule request is received from the originating user in regard to a potential schedule event with a receiving user. The potential schedule request includes a plurality of potential time slots in which the potential schedule event may be conducted between the originating user and the receiving user. The potential schedule event is then added to the potential calendar of both the originating user and the receiving user. In particular, adding the potential schedule event to a potential calendar includes adding the plurality of potential time slots of the potential schedule event to the potential calendar of the user. Clarifying information regarding the potential schedule event is then received. The clarifying information comprises data affecting or relevant to scheduling the potential schedule event. In response to receiving the clarifying information: an affected potential time slot of the potential schedule event is determined; a likelihood value of being able to schedule the potential schedule event at the affected potential time slot is determined; a likelihood value of being able to schedule the potential schedule event at the affected potential time slot meets or exceeds a predetermined threshold value is determined for the affected potential time slot; and upon determining that the likelihood value of being able to schedule the potential schedule event at the affected potential time slot does not meet or exceed the predetermined threshold, the affected potential time slot is removed from the potential schedule event of the potential calendars of the originating user and the receiving user. A potential time slot of the potential schedule event is selected and the potential schedule event is promoted to an explicit calendar of the originating user and the receiving user at the selected potential time slot. After promoting the potential schedule event to the explicit calendars, the potential schedule event is released from the potential calendars of the originating user and the receiving user.

According to yet additional aspects of the disclosed subject matter, a computer-readable medium bearing computer-executable instructions configured to carry out a method for scheduling users is provided. In execution of a computing device comprising at least a processor, a potential calendar for each of a plurality of users, including at least the originating user and a receiving user, is provided. A potential schedule request is received from the originating user for a potential schedule event to be held with the receiving user. The potential schedule request comprises a plurality of potential time slots in which the potential schedule event may be conducted between the originating user and the receiving user. The potential schedule event is the added to the potential calendar of both the originating user and the receiving user. Adding the potential schedule event to a potential calendar includes adding the plurality of potential time slots to the potential calendar of both users. Clarifying information is repeatedly obtained regarding the potential schedule event. Each instance of the clarifying information includes data affecting or relevant to scheduling the potential schedule event. In response to each instance of obtaining clarifying information: an affected potential time slot of the potential schedule event is determined; a likelihood value of being able to schedule the affected potential schedule event at the affected potential time slot determined; a determination regarding whether the likelihood value of being able to schedule the potential schedule event at the affected potential time slot meets or exceeds a predetermined threshold value is made; and upon determining that the likelihood value of being able to schedule the potential schedule event at the affected potential time slot does not meet or exceed the predetermined threshold, the affected potential time slot is removed from the potential schedule event of the potential calendars of the originating user and the receiving user. Thereafter, a potential time slot of the potential schedule event is selected and the potential schedule event is promoted to an explicit calendar of the originating user and the receiving user at the selected potential time slot. Additionally, the potential schedule event from the potential calendars of the originating user and the receiving user is released.

According to still further aspects of the disclosed subject matter, computer system for scheduling an event is presented. The computer system includes processor and a memory, where the processor executes instructions stored in the memory as part of or in conjunction with additional components to respond to a search query, the additional components including a scheduling service, a clarifying component, and a potential event promotion component. In execution on the computer system, the scheduling service manages calendar data for one or more computer users, including a potential calendar for each of the one or more computer users. Further, the scheduling service is configured to receive a potential scheduling request from an originating user in regard to a potential schedule event and schedule potential schedule event for the originating user and at least one receiving user. The clarifying component, in execution, is configured to receive clarifying information regarding the potential schedule event and, in processing the clarifying information: identifies at least one affected potential time slot associated with the potential schedule event that is affect; determines a likelihood value for the at least one affected potential time slot; determines whether the likelihood value meets or exceeds a predetermined threshold value; and upon determining that the likelihood value does not meet or exceed the predetermined threshold value, removes the affected potential time slot from the potential schedule event. Further, the potential event promotion component, upon selection of a potential time slot for the potential schedule event: promotes the potential schedule event to an explicit calendar of the originating user and the one or more receiving users at the selected potential time slot, and releases the potential schedule event from the potential calendars of the originating user and the one or more receiving users

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

For purposes of definition, an originating user refers to a user that schedules one or more others with regard to an event. A receiving user refers to a user that has received a schedule request for an event from an originating user.

As will be readily appreciated, a computer user (user) will typically maintain one or more calendars. If the user has just one, it is often just his/her calendar. If the user has several, he/she may (by way of illustration) maintain a work calendar, a personal/home calendar, and the like. Irrespective of whether or not the user maintains one or many calendars, these are calendars which the user explicitly manages: explicitly adds events or appointments and/or accepts schedule requests from other users. For purposes of this document, these calendars are referred to as "explicit calendars."

In addition to explicit calendars, in some instances users may also have behavioral or implied calendars, hereafter referred to as "implicit calendars." Implicit calendars are maintained by executing processes on behalf of the corresponding user and reflect the user's availability (free, busy, etc.) based on various contextual and behavioral conditions that are sensed or known to the executing processes. These conditions may include the user's particular location (e.g., working from home and, therefore, unavailable for an in-person appointment with another user) and established behaviors (e.g., the user never arrives to work before game so the user is unavailable for scheduling before that time). Events implied by a behavioral calendar may or may not be reflected in an explicit calendar that the user actively manages but may accurately indicate whether the user is available to be scheduled or not.

In addition to explicit and implicit calendars and according to aspects of the disclosed subject matter, an additional type of calendar, referred to as a potential calendar, is also associated with the computer users. A potential calendar includes one or more potential schedule requests, each potential schedule request corresponding to a potential schedule event where the specific date/time is to be determined. While the specific date/time for the potential schedule event is yet to be determined, each potential schedule request will include one or more potential time slots, i.e., a set of time slots (each time slot including at least a date and time) among which the originating user wishes to hold/conduct the potential schedule event. A potential schedule request is not an actual schedule request as found on the user's explicit calendar, but reflects a potential to be scheduled at one or more potential time slots.

As will be discussed in greater detail below, when a potential schedule request regarding an event is made, one or more potential time slots for the potential schedule event are identified. Over time and/or in response to clarifying information, the set of potential time slots for a potential schedule event is reduced to a point where a potential time slot is selected as an actual time slot for the potential schedule event, either manually by the originating user or automatically according to various criteria, at which point the potential schedule event is converted to an actual schedule request on the receiving user's explicit calendar and removed the various potential calendars. By way of definition, clarifying information, also referred to as a clarifying update, corresponds to information and/or data that may affect or is relevant to the likelihood of successfully scheduling a potential schedule event in one or more potential time slots. Clarifying information may include by way of illustration and not limitation: newly added (or removed) calendar information from a user (e.g., an originating and/or receiving user), the passage of time such that some potential time slots are no longer available or viable, user preferences with regard to one or more potential time slots (from the originating and/or receiving users), and the like. In one embodiment, user preferences may be returned as clarifying information in response to a poll sent out by the originating user in regard to which of the potential time slots is preferred by the receiving user(s).

Figure 1:
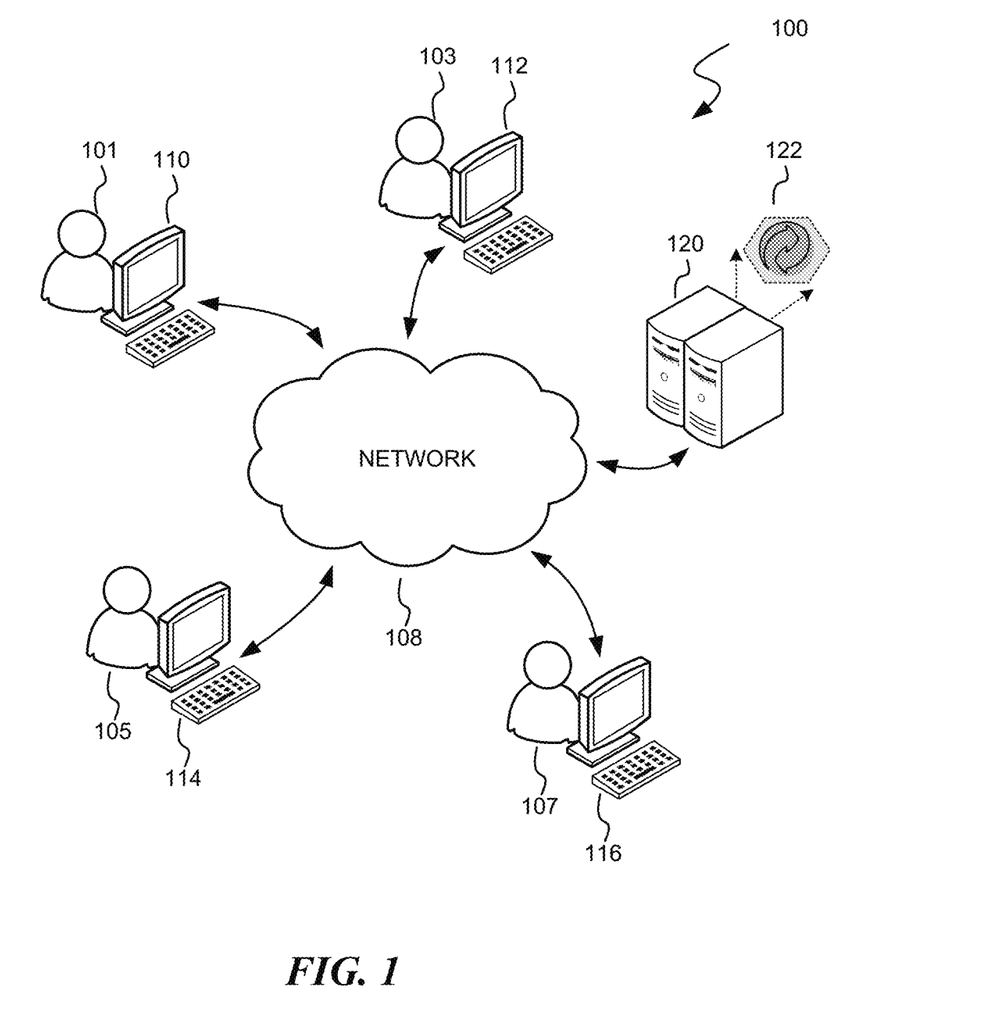
FIG. 1 is block diagram illustrating an exemplary network environment suitable for implementing aspects of the disclosed subject matter.

Turning now to the figures, FIG. 1 is block diagram illustrating an exemplary network environment 100 suitable for implementing aspects of the disclosed subject matter. The network environment 100 includes user computers 110-116, each corresponding to a computer user (e.g., computer user 101-107). Each computer user 103-107 has his/her own calendar (or calendars) which may be maintained on his/her own user computer 110-116 or on a hosting computer 120. These calendars include, at least, explicit calendars and potential calendars.

The user computers 110-116 and the hosting computer 120 are interconnected via a network 108. By way of illustration and not limitation, the network 108 corresponds to communication technology by which the various computers, including user computers 110-116 and hosting computer 120, can inter-communicate including sending and receiving data. This communication technology may comprise the Internet (a global system of interconnected computer networks that use the Internet protocol suite to the devices), a wide area network or WAN, a local-area network or LAN, intranets, various combinations of the foregoing, and the like. The various computers 110-116 and 120 may inter-communicate over the network 108 by way of wired connections, wireless connections, optical connections, and the like. Typically, a computer will communicate over the network with other computers and/or devices by way of a network interface comprising hardware and software components that implement the corresponding networking communication protocols.

As indicated above, computer users (all or some) may maintain their calendar information on their own user computer such that a potential schedule request (i.e., a schedule request to be first placed in the users' potential calendar) from an originating user is sent to the user computers of each receiving user. Alternatively, the hosting computer may host the calendars for all or some computer users such that a potential schedule request for calendar information for a given computer user is routed to a service 122, i.e., a process operating on the hosting computer 120 which is configured to respond to the potential schedule request with calendar information for the receiving users. Obtaining calendar information from receiving computer is one of the first steps in determining potential time slots in which a potential scheduled event may occur. By way illustration and not limitation, users 101 and 103 may maintain their own calendar information on their corresponding user computers 110 and 112, while users 105 and 107 may have their calendar information hosted by a service 120 operating on the hosting computer 120.

Figure 2:
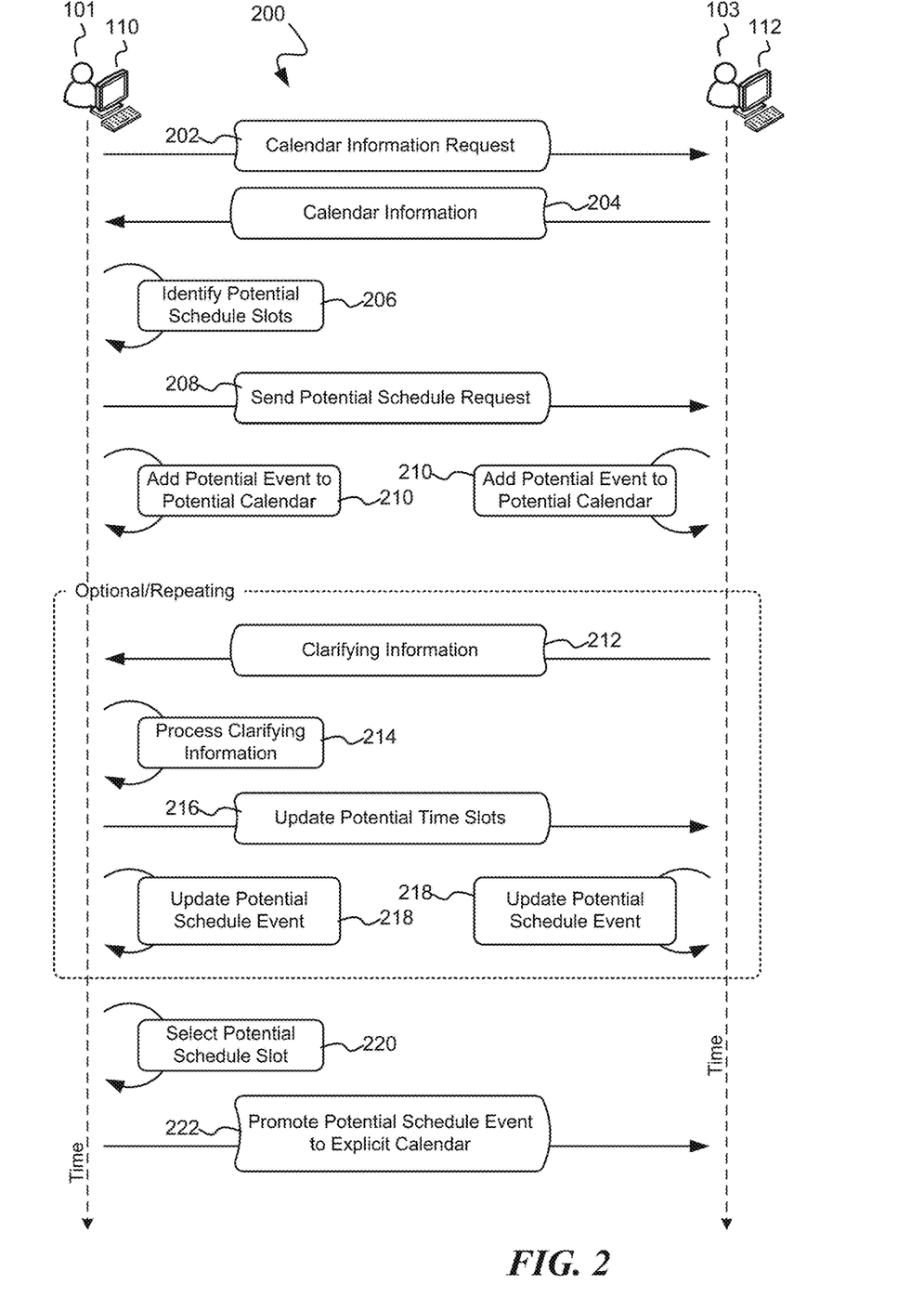
FIG. 2 is a block diagram illustrating an exemplary interaction between a first and second user in regard to the first user scheduling a time with the second user.

In regard to the scheduling process, and in particularly in regard to potential schedule requests according to the disclosed subject matter, reference is made to FIG. 2. FIG. 2 is a block diagram illustrating an exemplary interaction 200 between a first and second computer user (e.g., computer users 101 and 103) in regard to the first computer user (the originating user) scheduling a time with the second computer user (the receiving user) according to aspects of the disclosed subject matter. This interaction begins with computer user 101, by way of user computer 110 desiring to schedule an appointment with computer user 103. As indicated in FIG. 2, a calendar information request 202 is sent to the user computer 112 of computer user 103. Of course, while the present discussion of the interaction 200 is made in regard to the computer users hosting their calendar information on their own user computers, the interaction is generally the same (other than the responding computer) irrespective of whether the calendar information is hosted on the user's computer or on a hosting computer, such as hosting computer 120.

In response to the calendar information request 202, calendar information 204 is returned to the originating computer user. According to aspects of the disclosed subject matter, this calendar information 204 may include explicit calendar information, implicit calendar information, as well as potential calendar information, all of which may be used to identify potential time slots for generating a potential schedule event.

With the calendar information 204 of the receiving user, as well as that of the originating user, and in light of scheduling constraints supplied by the originating user, a scheduling process identifies one or more potential time slots in which the potential event may be scheduled, as indicated by block 206. Identifying one or more potential time slots in which a potential schedule event may be scheduled is discussed in greater detail below in regard to FIG. 4. The result of this scheduling process 206 is the identification of one or more time periods, i.e., potential time slots, where the likelihood of successfully scheduling the potential schedule event meets or exceeds a predetermined threshold.

A potential schedule request is formed which includes the potential time slots and, the potential schedule request 208 is sent to the receiving computer user 103 (via the receive computer user's computer 112). In process step 210, the potential schedule event embodied in the potential schedule request is added to the receiving user's and the originating user's potential calendar, with each of the potential time slots included in the potential calendars of both users in association with the potential schedule event.

As mentioned above, over time and/or in response to clarifying information, the set of potential time slots for a potential schedule request is reduced to a point where a potential time slot may be selected as an actual time slot for the potential schedule event, at which point the potential schedule request is converted to an actual schedule request on the receiving user's explicit calendar as well as the originating user's calendar, and removed from the originating and receiving users' potential calendars. This process of reducing the potential time slots for a potential schedule request is outlined in the optional/repeating block comprising the steps 212-218. As indicated, these steps may be viewed as optional as the originating user may (for whatever reason) select one of the potential time slots as the actual time slot for the potential schedule event, thereby converting the potential schedule event to an actual event in the explicit calendars of those involved (i.e., receiving user and originating user). Typically, however, the narrowing/reducing process is conducted one or more times.

In reducing the potential times for an event, clarifying information 212 is received from the receiving user (or, while not show, may also be obtained from the originating user.) The clarifying information may indicate one of a number of conditions that relate to the potential schedule request and, in particular, the potential times for the potential schedule request. By way of illustration and not limitation, these conditions may include: a preference from a receiving or originating user with regard to which time slot works best and/or would be preferred; information of a new event on a user's calendar (of either the originating or receiving user) that would conflict with a potential time slot; information of a removed event from a user's calendar (that might also create a new potential time slot for the potential schedule request); information regarding the location of a user with regard to a potential time slot that would indicate that the user could/could not be present at a particular time slot; passage of time such that potential time slots are in the past; and the like.

At process step 214, the clarifying information is processed to determine the likely time slots for the potential schedule request. While, often, this processing will reduce the number of potential time slots that are associated with the potential schedule event, in some circumstances a potential time slot may be added. After processing the clarifying information, an update 216 to the potential schedule event is sent. At process step 218, the potential schedule request is updated for all of the users (originating user and receiving user.)

At some point in time (which may include one or more updates to the potential schedule request) through the process described in process steps 212-218, the number of potential time slots for the potential schedule event is reduced such that a potential time slot (of any remaining time slots) may be and is selected as indicated by process step 220. As with the clarifying information, the basis (or bases) for which a potential time slot is eventually selected as the actual time slot for promoting the potential schedule request to an actual schedule request may be based on various conditions that include, by way of illustration and not limitation: the last remaining potential time slot; the potential time slot in which a critical number of users (or key users) are most likely to be available to attend; the potential time slot most preferred by the scheduled users; and the like. Further, the selection of the potential time slot may be made manually or automatically according to the criteria identified above.

After selecting the potential time slot for the actual event, at process step 222 a message promoting the potential schedule event (according to the selected potential time slot) as an actual schedule event is sent to the various users. In promoting the potential schedule event, causes the removal of the potential schedule request from the potential calendars of the involved users (including removing all potential time slots related to the potential schedule request from the potential calendars) and places a schedule event on the actual, explicit calendars at the selected date/time of the involved users.

Figure 3:
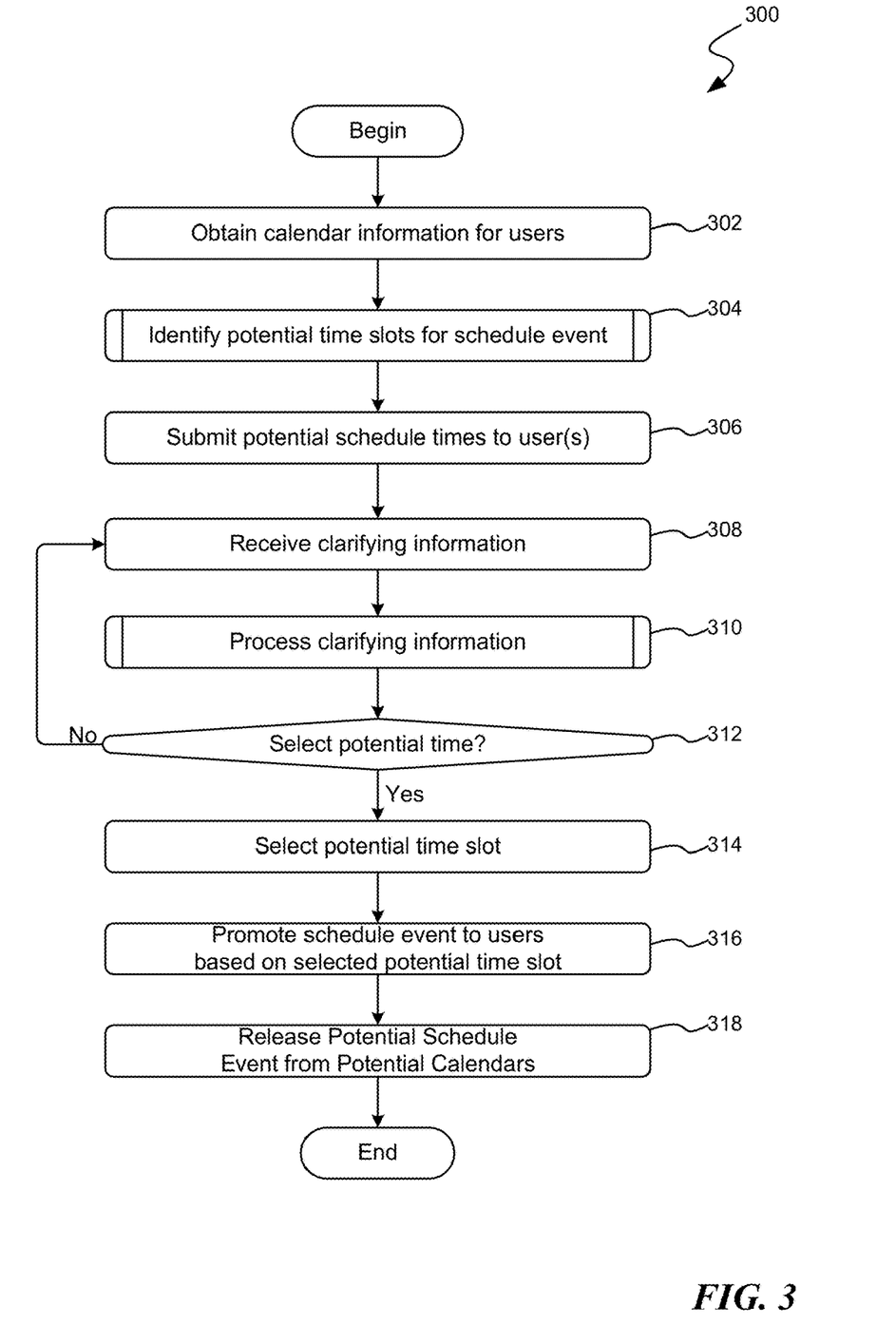
FIG. 3 is a flow diagram illustrating an exemplary routine for scheduling an event using the potential calendars of one or more users in accordance with aspects of the disclosed subject matter.

Turning to FIG. 3, this figure is a flow diagram illustrating an exemplary routine 300 for scheduling an event using the potential calendars of one or more users, in accordance with aspects of the disclosed subject matter. Beginning with block 302, the routine 300 obtains calendar information for each of the users that are to be part of the scheduled event, including the originating user and one or more receiving users. As indicated above, this calendar information will typically include the explicit calendar(s) of each user, the potential calendars of each user, as well as any implicit calendar information for the users.

At block 304, potential time slots for the potential schedule event, according to the calendar information of the users, are identified. Identifying potential time slots for the potential schedule event is discussed in greater detail below in regard to FIG. 4. Indeed, turning to FIG. 4, this figure is a flow diagram illustrating an exemplary routine 400 for identifying potential time slots for a potential schedule event in accordance with aspects of the disclosed subject matter. Beginning in block 402, the various calendars of the users involved in potential schedule request, including the originating user and receiving user(s), are combined. Combining the calendars of the users allows the routine 400 to evaluate various options (in terms of time slots) for scheduling the potential schedule event.

Figure 4:
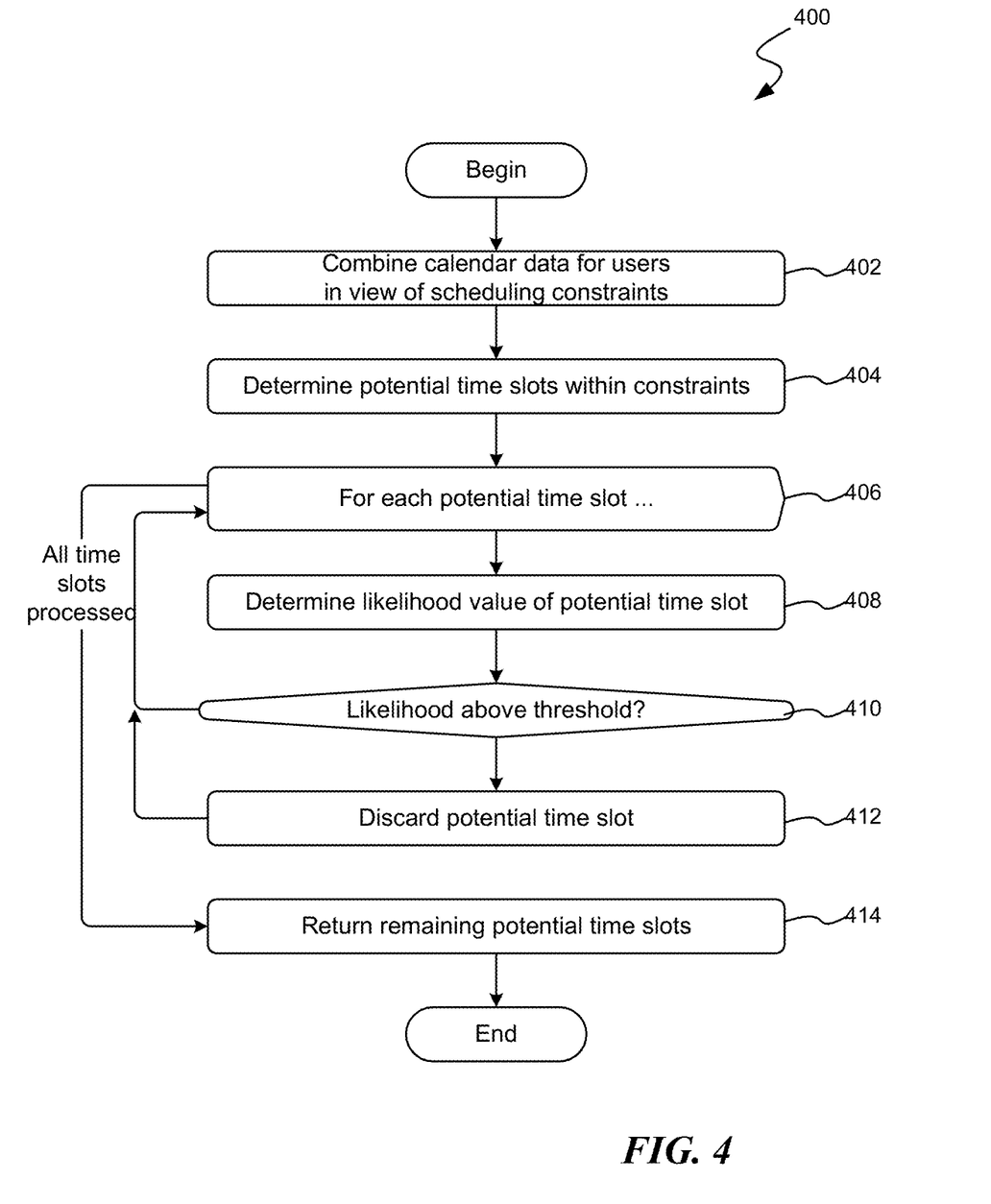
FIG. 4 is a flow diagram illustrating an exemplary routine for identifying potential time slots for a potential schedule event in accordance with aspects of the disclosed subject matter.

At block 404, potential time slots for the potential schedule request, according to the constraints provided by the originating user, are determined. The constraints may include, by way of illustration and not limitation, various days of the week that potential schedule request should occur; times of the day (e.g., morning, afternoon, over lunch, etc.) in which the potential schedule event should occur or cannot occur; specific days that are to be excluded; and the like. As will be appreciated, this initial determination identifies those times that could be used (irrespective of conflicts of the various users) to potentially schedule the potential schedule event.

At block 406, an iteration loop is begun to iterate through the identified potential time slots to determine a likelihood value of actually scheduling the event in the corresponding time slot. This iteration includes steps 408-412 as described below. Indeed, at block 408 a likelihood value of being able to schedule the potential schedule event at the currently iterated potential time slot is determined. This likelihood is determined according to the combined/aggregated calendar information of the various users. According to aspects of the disclosed subject matter, the likelihood value is assigned to the currently iterated time slot based, at least in part, on whether the time slot is free of scheduling conflicts (both actual and potential) among the users and/or the degree that the currently iterated time slot is conflicted, i.e., some users, potentially optional users, have conflicts at that particular time, time slots that are that more conflicted, time slots where the required users are conflicted, conflicts with a potential time slot of another potential schedule event, tentative conflicts, and the like. By way of illustration, a likelihood value may be based on a score from 0 to 1, where 0 reflects that there is no likelihood of hosting the potential schedule event at that time slot and 1 represents a current likelihood of 100% availability of all users at that time slot. By way of example, if there are to be 4 users (including the organizing user) in the scheduled event, a likelihood value may be determined for the time slot according to the percentage of the 4 users that are free for scheduling at that time. If three of the 4 users are free and one is conflicted, the likelihood value determined for the time slot might be 0.75. Of course, with additional information, such as required vs. optional attendance, a tentative vs. a busy status of a conflict, a conflict with a potential time slot of another potential schedule event, different weightings may be applied to different users. Implicit calendar information may also be applied to weight the availability of a corresponding user to the time slot. By way of simple illustration and without limitation, a formula for determining the likelihood of availability may be to assign each of the users a first count, assign any user whose presence is not considered optional another count, and each count corresponds to an equal percentage value. Assuming that there are six users and that four users are considered optional to attend, the total count is eight, each count corresponding to 12.5%. With the count, an evaluation of the compiled aggregated calendar information may indicate (by way of example) that for the currently iterated time slot, four of the six are available and of the two that are not available, one of them is the optional attendee. Through summation of the percentages accorded to those that are available, the likelihood of successfully scheduling the event at the current time slot would be 0.625 or 62.5%. Of course, an actual formula for determining a likelihood value may be configured according to implementation criteria, and/or may be further configured by the originating user.

After determining the likelihood value of the potential time slot and at decision block 410, a determination is made as to whether the likelihood value meets or exceeds a predetermined threshold value. For example (by way of illustration and not limitation), a predetermined threshold value may be placed at 0.600. In the example above, if the threshold value was set at 0.600, then the time slot would be considered a likely potential time slot. Thus, the routine 400 would return to block 406 to iterate to the next time slot, thereby keeping the currently iterated time slot as one of the potential time slots for the potential schedule event. Alternatively, at block 410, if the likelihood value for the currently iterated time slot does not meet the predetermined threshold, the routine 400 proceeds to block 410 and the currently iterated time slot is discarded as a potential time slot for the potential schedule event. Thereafter, the routine 400 then returns to block 406 to iterate to the next time slot.

The iteration described above continues until there are no more potential time slots to process, at which point the routine 400 proceeds to block 414 where those potential time slots that were not discarded are returned as the set of potential time slots for the potential schedule event. Thereafter, routine 400 terminates.

Returning to routine 300 of FIG. 3 and a block 306, after identifying the potential time slots for the potential schedule event, a potential schedule request is submitted to the users based on the potential time slots, the request being sent to the originating user as well as the receiving users.

At block 308, the optional/repeating process described in regard to process steps 212-218 of FIG. 2 is begun. At block 308, clarifying information is received. At block 310, the clarifying information is processed. Processing the clarifying information involves similar steps to those described above in regard to routine 400, and are described in greater detail in regard to FIG. 5. Accordingly, turning to FIG. 5, this figure is a flow diagram illustrating an exemplary routine 500 for updating the potential time slots for of a potential schedule request according to clarifying information.

Figure 5:
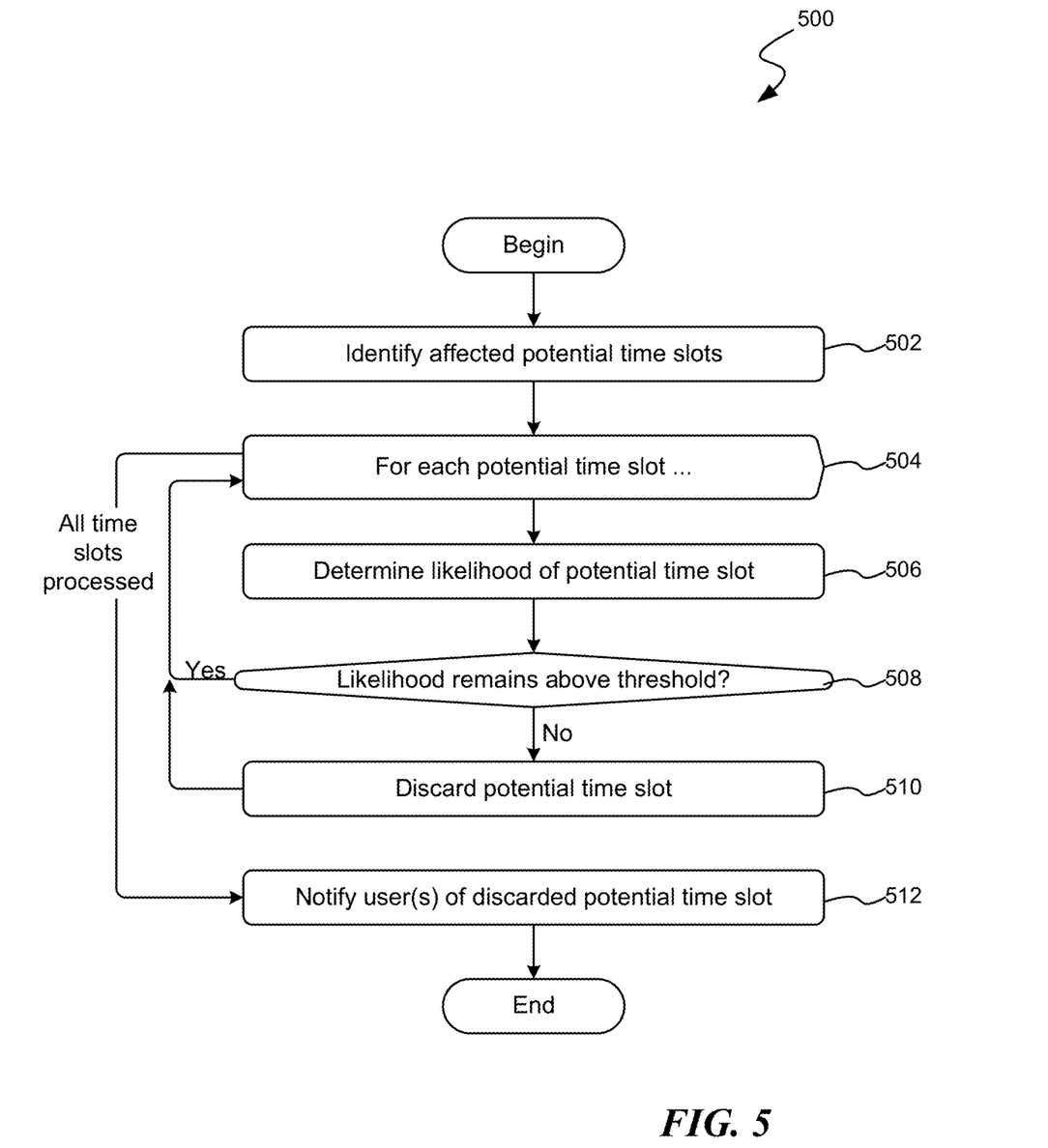
FIG. 5 is a flow diagram illustrating an exemplary routine for updating the potential time slots for of a potential schedule request according to clarifying information.

Beginning with block 502, the clarifying information is applied to the combined/aggregated calendar information of scheduled event to identify those potential time slots that are affected. As will be readily appreciated, updated calendar information (as may be included in the clarifying information) may affect one or more of the potential time slots of a potential schedule request, e.g., what was previously considered an available time slot for a particular user is no longer available, or what was previously considered an unavailable time slot is now available for scheduling. Similarly, the clarifying information may simply identify that time is past and affected potential time slots would include those potential time slots that are in the past.

After identifying potential time slots that are affected by the clarifying information, at block 504, for each affected potential time slot, an iteration is conducted. At block 506, a likelihood value of being able to schedule the potential schedule event at the currently iterated potential time slot is determined. According to one embodiment, determining the likelihood value for this potential time may be conducted in the same manner as described above in regard to block 408 of routine 400 of FIG. 4. After determining the likelihood value of the currently iterated potential time slot, at decision block 508, a determination is made as to whether the likelihood value of the currently iterated potential time slot meets or exceeds the predetermined threshold. If it meets/exceeds that threshold, the time slot is included as a potential time slot and the routine returns to block 504 to iterate to the next affected time slot. Alternatively, if the likelihood value of the potential time slot does not meet the predetermined threshold, the routine proceeds to block 510 where the currently iterated potential time slot is discarded as a potential time slot for the potential scheduled request.

When all of the affected potential time slots have been processed, the routine 500 proceeds to block 512 where the various users included in the potential schedule event are notified with regard to any updates to the potential time slots of the event. These updates may include new potential time slots to be included on the potential calendars of the various users, as well as removing some potential time slots that no longer meet the required threshold value. Thereafter, routine 500 terminates.

Returning again to routine 300 of FIG. 3, after processing the clarifying information, at block 312 a determination is made as to whether a potential time slot of the potential schedule event may be selected as the actual time for the event. This determination may be made according to, by way of illustration and not limitation, the originating user's input, a time slot meeting a particular qualifying threshold (e.g., one of the potential time slots has a likelihood value that exceeds 0.8), based on one potential time slot remaining in the potential schedule request, and the like. If it is determined that a potential time slot is to be selected for the potential schedule event, the routine 300 proceeds to block 314.

At block 314, a potential time slot for the promoted event is selected, as described above. At block 316, the potential schedule event is promoted on each of the users' calendars to a scheduled event at the selected potential time slots. At block 318, the potential schedule event is released/removed from the potential calendars of the users. Thereafter, the routine 300 terminates.

Regarding routines 300-500 described above, as well as other processes (such as interaction process 200) describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be omitted. Those skilled in the art will recognize that the logical presentation of steps is sufficiently instructive to carry out aspects of the claimed subject matter irrespective of any particular development language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

These routines/processes are typically embodied within executable code modules comprising routines, functions, looping structures, selectors such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or deliver the computer-executable instructions and data to a computing device for execution by one or more processor via various transmission means and mediums including carrier waves and/or propagated signals, for purposes of this disclosure computer readable media expressly excludes carrier waves and/or propagated signals.

Figure 6:
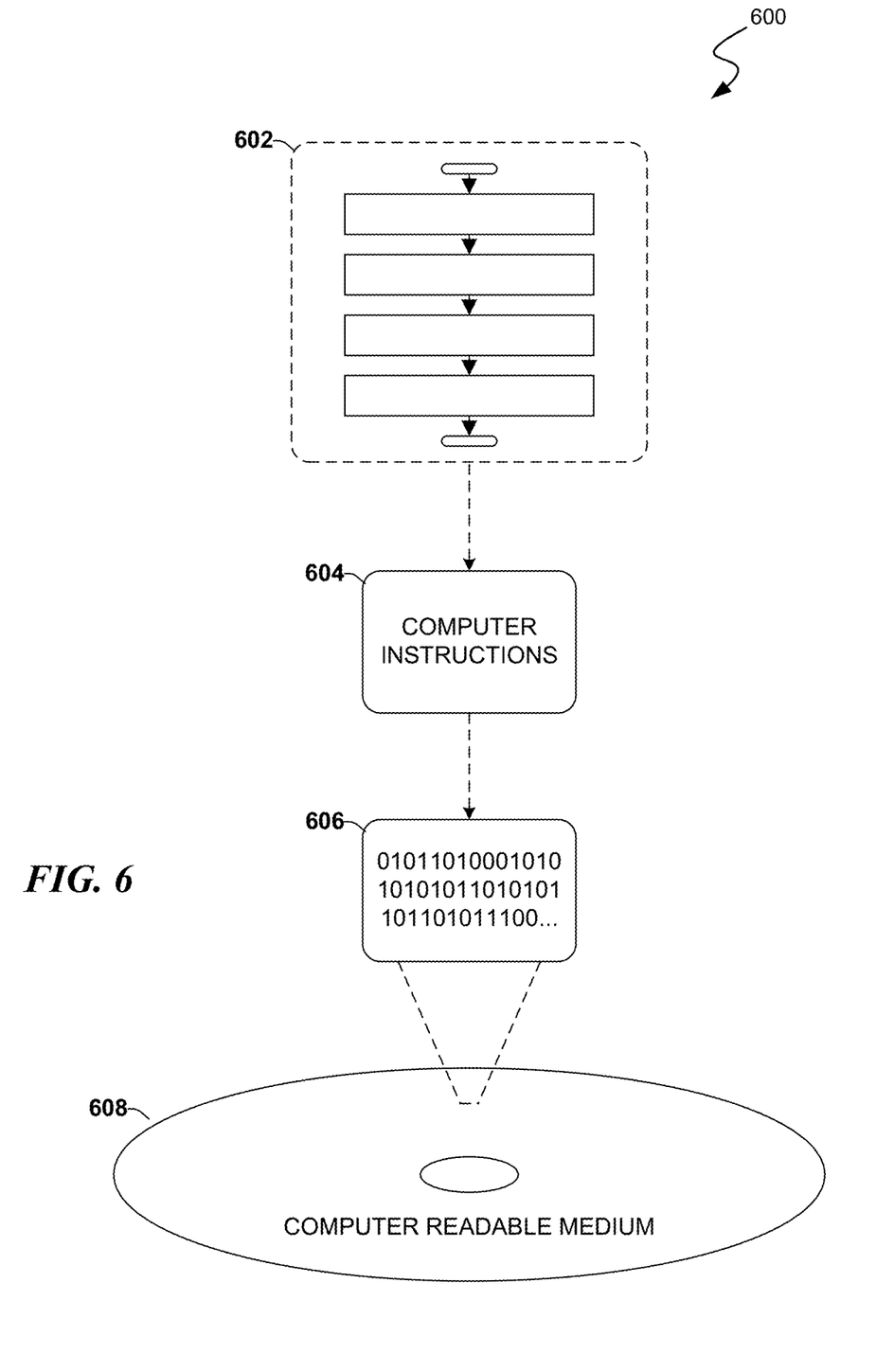
FIG. 6 is a block diagram illustrating an exemplary computer-readable media that may be manufactured in accordance with aspects of the disclosed subject matter.

Turning to FIG. 6, this figure illustrates and exemplary computer-readable media that may be manufactured in accordance with the above description. More particularly, the implementation 600 comprises a computer-readable medium 608 (e.g., a CD-R, DVD-R or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 804 may be configured to perform a method, such as at least some of the exemplary method 300 of FIG. 3, for example. In another such embodiment, the processor-executable instructions 804 may be configured to implement a system, such as at least some of the exemplary system 700 of FIG. 7, as described below. Many such computer-readable media may be devised by those of ordinary skill in the art that are configured to operate in accordance with the techniques presented herein.

Figure 7:
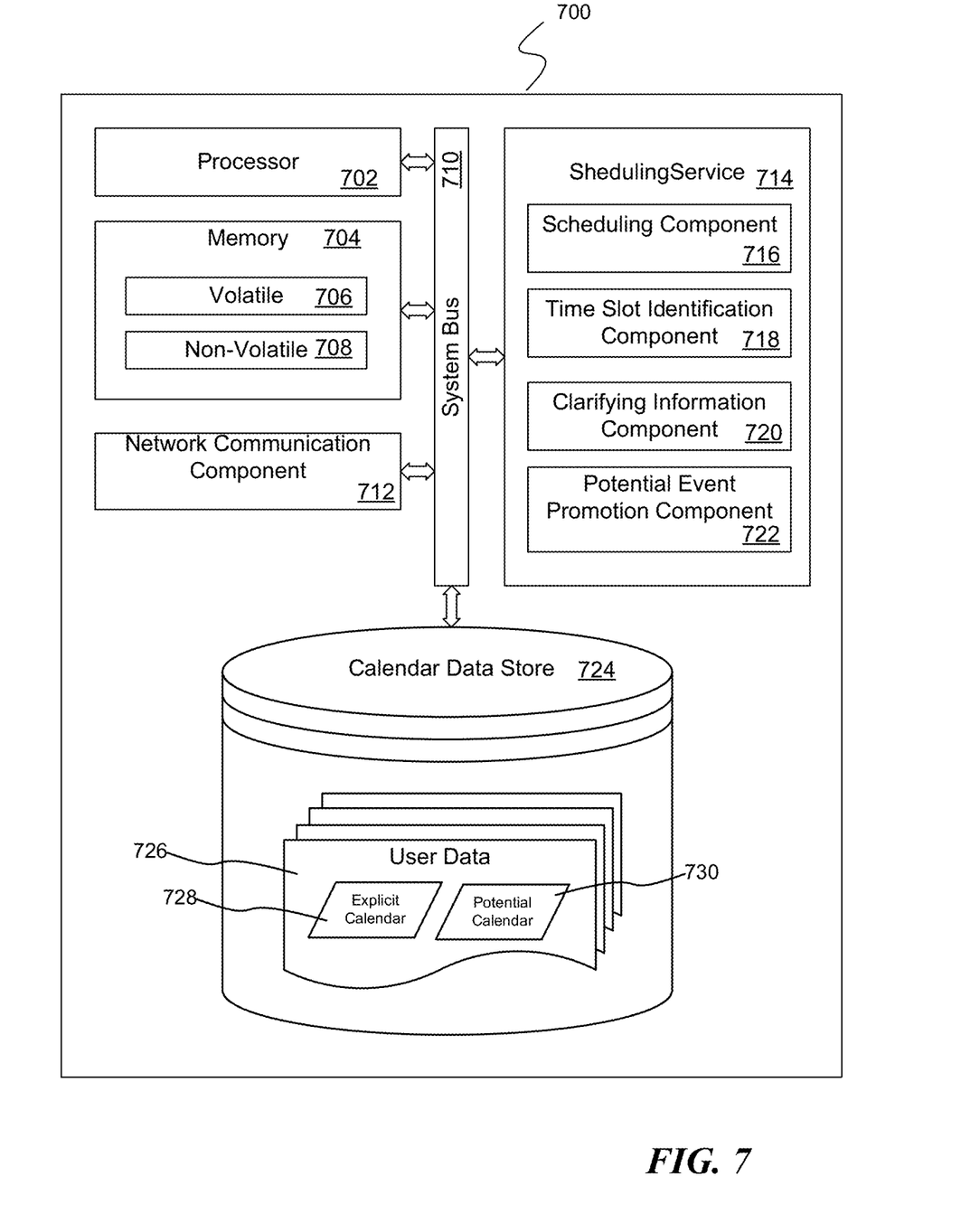
FIG. 7 is a block diagram illustrating an exemplary computing device suitable for implementing aspects of the disclosed subject matter.

With regard to FIG. 7, this figure is a block diagram illustrating an exemplary computing device 700 suitable for implementing aspects of the disclosed subject matter. While the exemplary computing device is described in terms of a hosting computing device, such as hosting computer 120 of FIG. 1, it should be appreciated that many of the various elements of the computing device 700 may be similarly implemented/configured on a user computing device, such as user computer 120.

The exemplary computing device 700 includes one or more processors (or processing units), such as processor 702, and a memory 704. The processor 702 and memory 704, as well as other components, are interconnected by way of a system bus 710. The memory 704 typically (but not always) comprises both volatile memory 706 and non-volatile memory 708. Volatile memory 706 retains or stores information so long as the memory is supplied with power. In contrast, non-volatile memory 708 is capable of storing (or persisting) information even when a power supply is not available. Generally speaking, RAM and CPU cache memory are examples of volatile memory 706 whereas ROM, solid-state memory devices, memory storage devices, and/or memory cards are examples of non-volatile memory 708.

Further still, the illustrated computing device 700 includes a network communication component 712 for interconnecting this computing device with other devices over a computer network, including user computers, such as user computers 110-116 of FIG. 1. The network communication component 712, sometimes referred to as a network interface card or NIC, communicates over a network (such as network 108) using one or more communication protocols via a physical/tangible (e.g., wired, optical, etc.) connection, a wireless connection, or both. As will be readily appreciated by those skilled in the art, a network communication component, such as network communication component 712, is typically comprised of hardware and/or firmware components (and may also include or comprise executable software components) that transmit and receive digital and/or analog signals over a transmission medium (i.e., the network.)

The processor 702 executes instructions retrieved from the memory 704 (and/or from computer-readable media, such as computer-readable media 600 of FIG. 6) in carrying out various functions, particularly in regard to responding to passively recording an ongoing audio or audio/visual stream and generating notes from the passive recordings, as discussed and described above. The processor 702 may be comprised of any of a number of available processors such as single-processor, multi-processor, single-core units, and multi-core units.

The exemplary computing device 700 further includes an executable scheduling service 714. Typically, but not exclusively, the scheduling service 714 is embodied as an executable process/service which, in execution on the computing device 700, manages the calendars of one or more computer users, such as computer users 101-107 of FIG. 1, as described above. While the scheduling service 714 may reside on the computing device 700 as application code, in alternative embodiments the scheduling service suitably be implemented as a hardware or firmware component, or a combination of both executable code and hardware/firmware. In operation and/or execution, the scheduling service component 714 implements the various functions of managing calendaring and scheduling services, including providing potential calendars and managing potential schedule requests/events for various computer users, as described above in this disclosure.

The scheduling service 714 may be comprised of a single component, or alternatively comprised of various sub-components (as shown) including a scheduling component 716, a time slot identification component 718, a clarifying information component 720, and a potential schedule event promotion component 722. Whether operating as a single component or comprises of multiple sub-components as shown, the scheduling service 714 provides the services and functionality described above in regard to routines 300-500 as well as process 200, in regard to maintaining, managing user calendars, including explicit and potential calendars, obtaining calendar information regarding various computer users, identifying potential time slots for scheduling potential events, processing clarifying information to narrow down potential time slots for a potential event, selecting a potential time slot for a potential schedule event and promoting the event to the actual/explicit calendars of the various users associated with an event.

Regarding the scheduling component 716, as suggested by the name, this executable component is configured to respond to scheduling requests, and particular in regard to potential schedule requests. The scheduling component 716 obtains calendar information, from explicit and potential calendars, as well as implicit calendar information, and in conjunction with the time slot identification component and in view of originating user constraints, creates and distributes a potential schedule request regarding a potential schedule event to the associated users, as described in steps 302-206 of routine 300 of FIG. 3. Correspondingly, the time slot identification component 718 is configured to identify potential time slots for a potential schedule event according to calendar information (including actual/explicit calendars and potential calendars) of the users identified in the potential schedule request. The time slot identification component 718 operates as described above in regard to routine 400 of FIG. 4.

The clarifying update component 720 is configured process clarifying updates on behalf of the scheduling service 714 as set forth above in regard to routine 500 of FIG. 5. In particular, the clarifying update component 720 receives clarifying information from a user associated with or identified in the potential schedule event, or as a result of the passage of time, and processes the information to identify those potential time slots where the likelihood value of occurring meet or exceed a predetermined threshold as well as identifying those potential time slots whose likelihood value of occurring fail to meet or exceed that predetermined threshold.

As the name suggests, the potential event promotion component 722 is configured to identify (either by manual selection or according to various selection criteria) a potential time slot of a potential schedule event and promote the potential schedule event to an actual schedule event on the associated users' explicit calendars, and further releasing the potential schedule event from the potential calendars of the associated users' potential calendars, as described above in regard to steps 314-318 of routine 300 of FIG. 3.

Also shown in the exemplary computing device 700 is a calendar data store 724. The calendar data store stores calendar data for one or more users, such as user calendar data 726. The calendar data for each user includes one or more explicit calendars, such as explicit calendar 728, as well as a potential calendar 730. While not shown, the user calendar data 726 may also include implicit calendar information for determining implicit calendar event, as described above.

Regarding the various components of the exemplary computing device 700, those skilled in the art will appreciate that these components may be implemented as executable software modules stored in the memory of the computing device, as hardware modules and/or components (including SoCs—system on a chip), or a combination of the two. Indeed, as indicated above, components such as the scheduling service 714 and it sub-components including the scheduling component 716, the time slot identification component 718, the clarifying update component 720, and the potential event promotion component 722, may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the exemplary computing device 700 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network, such as network 108 of FIG. 1.

While various novel aspects of the disclosed subject matter have been described, it should be appreciated that these aspects are exemplary and, unless otherwise noted, should not be construed as limiting upon the disclosed subject matter. In many instances, variations and alterations to the disclosed aspects may be made without departing from the scope of the disclosed subject matter.

What is claimed:

1. A computer-implemented method for providing a scheduling service for scheduling one or more users according to a schedule request from an originating user, the method comprising:

providing a potential calendar for each user of a plurality of users, the plurality of users including at least the originating user and a receiving user, wherein each user is associated with a respective explicit calendar that is maintained at least in part by the user, and wherein each potential calendar is maintained by the scheduling service;

receiving a potential schedule request from the originating user for a potential schedule event with the receiving user, the potential schedule request comprising a plurality of potential time slots occurring over a time period in which the potential schedule event may be conducted between the originating user and the receiving user;

adding the potential schedule event to the potential calendar of both the originating user and the receiving user, wherein adding the potential schedule event to the potential calendar includes adding the plurality of potential time slots to the potential calendar;

while one of the plurality of potential time slots has not been selected for the potential schedule event, iteratively reducing the plurality of potential time slots to a single potential time slot by:

determining an affected potential time slot of the potential schedule event, the affected potential time slot including one of the plurality of potential time slots included in the potential schedule event with a date and time occurring before a current date and time, and automatically removing the affected potential time slot from the potential schedule event of the potential calendar of the originating user and the potential calendar of the receiving user;

automatically selecting the single potential time slot for the potential schedule event when the single potential time slot is the only potential time slot of the plurality of potential time slots that has not been removed;

automatically adding an actual schedule event based on the potential schedule event to the explicit calendar of the originating user and the explicit calendar of the receiving user at the single potential time slot, the explicit calendar of the originating user and the explicit calendar of the receiving user distinct from the potential calendar of the originating user and the potential calendar of the receiving user, wherein the explicit calendar of the originating user and the explicit calendar of the receiving user are automatically modified to place the actual schedule event into an actual time slot corresponding to the single potential time slot, wherein the actual time slot in the explicit calendar of the originating user and the explicit calendar of the receiving user remain available prior to adding the actual schedule event, and wherein responsive to placing the actual schedule event into the actual time slot, the actual time slot is removed from consideration for other potential schedule events; and releasing the potential schedule event from the potential calendar of the originating user and the potential calendar of the receiving user.

2. The computer-implemented method of claim 1, wherein the affected potential time slot is determined based on obtained clarifying information regarding the potential schedule event, the clarifying information comprising data affecting or relevant to scheduling the potential schedule event.

3. The computer-implemented method of claim 2, wherein the clarifying information comprises newly added calendar information from the originating user or the receiving user.

4. The computer-implemented method of claim 2, wherein the clarifying information comprises newly removed calendar information from the originating user or the receiving user.

5. The computer-implemented method of claim 2, wherein the clarifying information comprises user preferences with regard to one or more potential time slots.

6. The computer-implemented method of claim 5, wherein the user preferences with regard to the one or more potential time slots is returned in response to a poll requesting user preferences.

7. The computer-implemented method of claim 2, wherein the clarifying information comprises a passage of time such that some potential time slots are no longer available or viable.

8. The computer-implemented method of claim 1, wherein the receiving user is a user that received the schedule request from the originating user.

9. A non-transitory computer-readable medium bearing computer-executable instructions which, when executed on a computing system comprising at least a processor, carry out a method of providing a scheduling service for scheduling users, the method comprising:

providing a potential calendar for each user of a plurality of users, the plurality of users including at least an originating user and a receiving user, wherein each user is associated with a respective explicit calendar that is maintained at least in part by the user, and wherein each potential calendar is maintained by the scheduling service;

receiving a potential schedule request from the originating user for a potential schedule event with the receiving user, the potential schedule request comprising a plurality of potential time slots occurring over a time period in which the potential schedule event may be conducted between the originating user and the receiving user;

adding the potential schedule event to the potential calendar of both the originating user and the receiving user, wherein adding the potential schedule event to the potential calendar includes adding the plurality of potential time slots to the potential calendar;

while one of the plurality of potential time slots has not been selected for the potential schedule event, iteratively reducing the plurality of potential time slots to a single potential time slot by:

determining an affected potential time slot of the potential schedule event, the affected potential time slot including one of the plurality of potential time slots included in the potential schedule event with a date and time occurring before a current date and time, and automatically removing the affected potential time slot from the potential schedule event of the potential calendar of the originating user and the potential calendar of the receiving user;

automatically selecting the single potential time slot for the potential schedule event when the single potential time slot is the only potential time slot of the plurality of potential time slots that has not been removed;

automatically adding an actual schedule event based on the potential schedule event to the explicit calendar of the originating user and the explicit calendar of the receiving user at the single potential time slot, the explicit calendar of the originating user and the explicit calendar of the receiving user distinct from the potential calendar of the originating user and the potential calendar of the receiving user, wherein the explicit calendar of the originating user and the explicit calendar of the receiving user are automatically modified to place the actual schedule event into an actual time slot corresponding to the single potential time slot, wherein the actual time slot in the explicit calendar of the originating user and the explicit calendar of the receiving user remain available prior to adding the actual schedule event, and wherein responsive to placing the actual schedule event into the actual time slot, the actual time slot is discarded as a potential time slot for other potential schedule events; and releasing the potential schedule event from the potential calendar of the originating user and the potential calendar of the receiving user.

10. The non-transitory computer-readable medium of claim 9, wherein the affected potential time slot is determined based on obtained clarifying information regarding the potential schedule event, the clarifying information comprising data affecting or relevant to scheduling the potential schedule event.

11. The non-transitory computer-readable medium of claim 10, wherein the clarifying information comprises any one or more of:

newly added calendar information from the originating user or the receiving user;

newly removed calendar information from the originating user or the receiving user; and user preferences with regard to one or more potential time slots.

12. The non-transitory computer-readable medium of claim 10, wherein the clarifying information comprises a passage of time such that some potential time slots are no longer available or viable.

13. A computer system that provides a scheduling service for scheduling an event, the computer system comprising:

a processor, wherein the processor, through execution of instructions stored in a memory as part of or in conjunction with additional components to respond to a search query, is configured to:

manage calendar data for one or more computer users, including a potential calendar for each of the one or more computer users, receive a potential schedule request from an originating user in regard to a potential schedule event, the potential schedule request comprising a plurality of potential time slots occurring over a time period, and schedule the potential schedule event for the originating user and a receiving user;

while one of the plurality of potential time slots has not been selected for the potential schedule event, iteratively reduce the plurality of potential time slots to a single potential time slot by:

identifying an affected potential time slot associated with the potential schedule event that is affected, the affected potential time slot including one of the plurality of potential time slots included in the potential schedule event with a date and time occurring before a current date and time, and automatically removing the affected potential time slot from the potential schedule event of the potential calendar of the originating user and the potential calendar of the receiving user;

automatically select the single potential time slot for the potential schedule event when the single potential time slot is the only potential time slot of the plurality of potential time slots that has not been removed;

automatically add an actual schedule event based on the potential schedule event to an explicit calendar of the originating user and an explicit calendar of the receiving user at the single potential time slot, wherein the explicit calendar of the originating user and the explicit calendar of the receiving user are maintained at least in part by the originating user and the receiving user, respectively, and are distinct from the potential calendar of the originating user and the potential calendar of the receiving user which are maintained by the scheduling service, wherein the explicit calendar of the originating user and the explicit calendar of the receiving user are automatically modified to place the actual schedule event into an actual time slot corresponding to the single potential time slot, wherein the actual time slot in the explicit calendar of the originating user and the explicit calendar of the receiving user remain available prior to adding the actual schedule event, and wherein responsive to placing the actual schedule event into the actual time slot, the actual time slot is determined to be unavailable for other potential schedule events; and release the potential schedule event from the potential calendar of the originating user and the potential calendar of the receiving user.

14. The computer system of claim 13, wherein the affected potential time slot is identified based on obtained clarifying information regarding the potential schedule event, the clarifying information comprising data affecting or relevant to scheduling the potential schedule event.

15. The computer system of claim 14, wherein the clarifying information comprises a passage of time such that some potential time slots are no longer available or viable.

16. The computer system of claim 13, wherein the processor is configured to repeatedly receive and process clarifying information regarding the potential schedule event prior to the selection of the selected single potential time slot.

17. The computer system of claim 16, wherein the clarifying information comprises newly added calendar information from the originating user or the receiving user.

18. The computer system of claim 16, wherein the clarifying information comprises newly removed calendar information from the originating user or the receiving user.

19. The computer system of claim 16, wherein the clarifying information comprises user preferences with regard to one or more potential time slots.

20. The computer system of claim 19, wherein the user preferences with regard to the one or more potential time slots is returned in response to a poll requesting user preferences.

* * * * *